(12) United States Patent
Ellison et al.

(10) Patent No.: US 7,085,935 B1
(45) Date of Patent: Aug. 1, 2006

(54) MANAGING A SECURE ENVIRONMENT USING A CHIPSET IN ISOLATED EXECUTION MODE

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 1212 days.

(21) Appl. No.: 09/668,408

(22) Filed: Sep. 22, 2000

Related U.S. Application Data (63) Continuation-in-part of application No. 09/540,613, filed on Mar. 31, 2000.

(51) Int. Cl.
*G08F 13/14* (2006.01)

(52) U.S. Cl. .................. 713/200; 713/164; 713/182; 713/200; 709/250; 711/110; 711/170; 712/10; 712/300

(58) Field of Classification Search .......... 713/164–182, 713/200; 709/100–250; 711/110–170; 712/10–300
See application file for complete search history.

(56) References Cited

U.S. PATENT DOCUMENTS 4,037,214 A  7/1977  Birney et al.
4,162,536 A  7/1979  Morley
4,247,905 A  1/1981  Yoshida et al.

(Continued)

FOREIGN PATENT DOCUMENTS

DE  4217444  12/1992
EP  0473913  3/1992
EP  0600112  8/1994

(Continued)

OTHER PUBLICATIONS

Coulouris, George, et al., "Distributed Systems, Concepts and Designs", *2nd Edition*, (1994), 422–424.

Crawford, John, "Architecture of the Intel 80386", *Proceedings of the IEEE International Conference on Computer Design: VLSI in Computers and Processors (ICCD '86)*, (Oct. 6, 1986), 155–160.

Fabry, R.S., "Capability–Based Addressing", *Fabry, R.S., "Capability–Based Addressing," Communications of the ACM*, vol. 17, No. 7 (Jul. 1974), 403–412.

(Continued)

*Primary Examiner*—Ayaz Sheikh
*Assistant Examiner*—Taghi T. Arani
(74) *Attorney, Agent, or Firm*—Michael R. Barre (57) ABSTRACT

A chipset is initialized in a secure environment for an isolated execution mode by an initialization storage. The secure environment has a plurality of executive entities and is associated with an isolated memory area accessible by at least one processor. The at least one processor has a plurality of threads and operates in one of a normal execution mode and the isolated execution mode. The executive entities include a processor executive (PE) handler. PE handler data corresponding to the PE handler are stored in a PE handler storage. The PE handler data include a PE handler image to be loaded into the isolated memory area after the chipset is initialized. The loaded PE handler image corresponds to the PE handler.

53 Claims, 8 Drawing Sheets

U.S. PATENT DOCUMENTS

| | | |
|---|---|---|
| 4,276,594 A | 6/1981 | Morley |
| 4,278,837 A | 7/1981 | Best |
| 4,307,214 A | 12/1981 | Birney et al. |
| 4,307,447 A | 12/1981 | Provanzano et al. |
| 4,319,323 A | 3/1982 | Ermolovich et al. |
| 4,347,565 A | 8/1982 | Kaneda et al. |
| 4,366,537 A | 12/1982 | Heller et al. |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,255,379 A | 10/1993 | Melo |
| 5,293,424 A | 3/1994 | Holtey et al. |
| 5,303,378 A | 4/1994 | Cohen |
| 5,317,705 A | 5/1994 | Gannon et al. |
| 5,319,760 A | 6/1994 | Mason et al. |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,473,692 A | 12/1995 | Davis |
| 5,479,509 A | 12/1995 | Ugon |
| 5,504,922 A | 4/1996 | Seki et al. |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,566,323 A | 10/1996 | Ugon |
| 5,568,552 A | 10/1996 | Davis |
| 5,606,617 A | 2/1997 | Brands |
| 5,615,263 A | 3/1997 | Takahashi |
| 5,628,022 A | 5/1997 | Ueno et al. |
| 5,657,445 A | 8/1997 | Pearce |
| 5,668,971 A | 9/1997 | Neufeld |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,825,875 A | 10/1998 | Ugon |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,898,883 A | 4/1999 | Fujii et al. |
| 5,900,606 A | 5/1999 | Rigal |
| 5,901,225 A | 5/1999 | Ireton et al. |
| 5,903,752 A | 5/1999 | Dingwall et al. |
| 5,937,063 A | 8/1999 | Davis |
| 5,950,221 A | 9/1999 | Draves et al. |
| 5,953,502 A | 9/1999 | Helbig, Sr. |
| 5,970,147 A | 10/1999 | Davis et al. |
| 5,978,481 A | 11/1999 | Ganesan et al. |
| 5,987,557 A | 11/1999 | Ebrahim |
| 6,014,745 A | 1/2000 | Ashe |
| 6,035,374 A * | 3/2000 | Panwar et al. ............... 711/118 |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,092,095 A | 7/2000 | Maytal |
| 6,101,584 A | 8/2000 | Satou et al. |
| 6,115,816 A | 9/2000 | Davis |
| 6,125,430 A | 9/2000 | Noel et al. |
| 6,148,379 A | 11/2000 | Schimmel |
| 6,158,546 A | 12/2000 | Hanson et al. |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,192,455 B1 | 2/2001 | Bogin et al. |
| 6,205,550 B1 | 3/2001 | Nardone et al. |
| 6,212,635 B1 | 4/2001 | Reardon |
| 6,222,923 B1 | 4/2001 | Schwenk |
| 6,226,749 B1 * | 5/2001 | Carloganu et al. .......... 713/201 |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,282,651 B1 | 8/2001 | Ashe |
| 6,282,657 B1 | 8/2001 | Kaplan et al. |
| 6,292,874 B1 * | 9/2001 | Barnett ....................... 711/153 |
| 6,301,646 B1 | 10/2001 | Hostetter |
| 6,308,270 B1 | 10/2001 | Guthery et al. |
| 6,314,409 B1 | 11/2001 | Schneck et al. |
| 6,321,314 B1 | 11/2001 | Van Dyke |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 * | 1/2003 | Ellison et al. ............... 712/229 |
| 6,535,988 B1 | 3/2003 | Poisner |
| 6,557,104 B1 | 4/2003 | Vu et al. |
| 6,633,963 B1 | 10/2003 | Ellison et al. |
| 6,633,981 B1 | 10/2003 | Davis |
| 6,701,284 B1 | 3/2004 | Huntley et al. |
| 2001/0003745 A1 | 6/2001 | Metlitski et al. |
| 2001/0021969 A1 | 9/2001 | Burger et al. |
| 2001/0027527 A1 | 10/2001 | Khidekel et al. |
| 2002/0007456 A1 * | 1/2002 | Peinado et al. ............. 713/164 |
| 2003/0018892 A1 | 1/2003 | Tello |

FOREIGN PATENT DOCUMENTS

| | | |
|---|---|---|
| EP | EP0892521 | 1/1999 |
| EP | 0930567 A | 7/1999 |

| | | |
|---|---|---|
| EP | EP0961193 | 12/1999 |
| EP | EP0965902 | 12/1999 |
| EP | 1 030 237 A | 8/2000 |
| EP | EP1055989 | 11/2000 |
| EP | EP1056014 | 11/2000 |
| EP | EP1085396 | 3/2001 |
| EP | 1146715 | 10/2001 |
| JP | 11161521 A | 6/1999 |
| JP | 2000076139 | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO99/38076 | 7/1999 |
| WO | WO9957863 | 11/1999 |
| WO | WO9965579 | 12/1999 |
| WO | WO0021238 | 4/2000 |
| WO | WO0062232 | 10/2000 |
| WO | WO 01/27723 | 4/2001 |
| WO | WO 01/27821 | 4/2001 |
| WO | WO0163994 | 8/2001 |
| WO | WO 01/75565 | 10/2001 |
| WO | WO 01/75595 | 10/2001 |
| WO | WO0201794 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Frieder, Gideon, "Architecture And Operational Characteristics of the VMX Host Machine", *The Architecture And Operational Characteristics of the VMX Host Machine, IEEE*, (1982),9–16.

Intel Corporation, "IA–64 System Abstraction Layer Specification", *Intel Product Specification, Order No. 245359–001*, (Jan. 2000), 1–112.

Intel Corporation, "Intel IA–64 Architecture Software Developer's Manual", *vol. 2: IA–64 System Architecture, Order No. 245318–001*, (Jan. 2000),i, ii, 5.1–5.3, 11.1–11.8, 11.23–11.26.

Menezes, Alfred J., et al., "Handbook of Applied Cryptography", *CRC Press Series on Discrete Mathematices and its Applications*, Boca Raton, FL. XP002165287, ISBN 0849385237,(Oct. 1996),403–405, 506–515, 570.

Nanba, S., et al., "VM/4: ACOS–4 Virtual Machine Architecture", *VM/4: ACOS–4 Virtual Machine Architecture, IEEE*, (1985), 171–178.

RSA Security, "Hardware Authenticators", www.rsasecurity.com/node.asp?id=1158, 1–2.

RSA Security, "RSA SecurID Authenticators", www.rsasecurity.com/products.securid/datasheets/SID DS 0103.pdf, 1–2.

RSA Security, "Software Authenticators", www.srasecurity.com/node.asp?id=1313, 1–2.

Schneier, Bruce, "Applied Cryptography: Protocols, Algorithm, and Source Code in C", *Wiley, John & Sons, Inc.*, XP002939871; ISBN 0471117099,(Oct. 1995),47–52.

Schneier, Bruce, "Applied Cryptography: Protocols, Algorithm, and Source Code in C", *Wiley, John & Sons, Inc.*, XP002138607; ISBN 0471117099,(Oct. 1995),56–65.

Schneier, Bruce, "Applied Cryptography: Protocols, Algorithms, and Source Code C", *Wiley, John & Sons, Inc.*, XP0021111449; ISBN 0471117099,(Oct. 1995), 169–187.

Schneier, Bruce, "Applied Cryptography: Protocols, Algorithms, and Source Code in C", *2nd Edition: Wiley, John & Sons, Inc.*, XP002251738; ISBN 0471128457,(Nov. 1995), 28–33; 176–177; 216–217; 461–473; 518–522.

Goldberg, R., "Survey of virtual machine research," IEEE Computer Magazine 7(6), pp. 34–45, 1974.

Gum, P.H., "System/370 Extended Architecture: Facilities for Virtual Machines," IBM J. Research Development, vol. 27, No. 6, pp. 530–544, Nov. 1983.

Rosenblum, M. "Vmware's Virtual Platform: A Virtual Machine Monitor for Commodity PCs," Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1–31.

"M68040 User's Manual", 1993, Motorola Inc., pp. 1–5–p. 1–9, pp. 1–13–pp. 1–20, pp. 2–1–pp. 2–3, p. 4–1, pp. 8–9–pp. 8–11.

"Intel 386 DX Microprocessor 32–BIT CHMOS Microprocessor with Integrated Memory Management", Dec. 31, 1995, Intel Inc., pp. 32–56; figure 4–14.

Joe Heinrich:"MIPS R4000 Microprocessor User's Manual", 1994, MIPS Technology Inc., Mountain View, CA, pp. 67–79.

Berg C: "How Do I Create a Signed Applet?", Dr. Dobb's Journal, M&T Publ., Redwood City, CA, US, vol. 22, No. 8, 8 '97, pp. 109–111, 122.

Gong L et al: "Going Beyond the Sandbox: an Overview of the New Security Architecture in the Java Development Kit 1.2", Proceedings of the Usenix Symposium on Internet Technologies and Systems, Montery, CA 12 '97, pp. 103–112.

J. Heinrich: "MIPS R4000 Microprocessor User's Manual," Apr. 1, 1993, MIPS, Mt. View, XP002184449, pp. 61–97.

Brands, Stefan, "Restrictive Blinding of Secret–Key Certificates", *Springer–Verlag XP002201306*, (1995),Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0–7695–0375–06, Los Alamitos, CA*, (Apr. 21, 1999), 209–221.

Compaq Computer Corporation, et al., "Trusted Computing Platform Alliance (TCPA) Main Specification Version 1.1a", (Dec. 2001), 1–321.

Davida, George I., et al., "Defending Systems Against Viruses through Cryptographic Authentication", *Proceedings of the Symposium on Security and Privacy*, IEEE Comp. Soc. Press, ISBN 0–8186–1939–2,(May 1989).

IBM, "Information Display Technique for a Terminate Stay Resident Program IBM Technical Disclosure Bulletin", *TDB–ACC–No. NA9112156, vol. 34, Issue 7A*, (Dec. 1, 1991), 156–158.

Karger, Paul A., et al., "A VMM Security Kernal for the VAX Architecture", *Proceedings of the Symposium on Research in Security and Privacy, XP010020182, ISBN 0–8186–2060–9, Boxborough, MA*, (May 7, 1990),2–19.

Kashiwagi, Kazuhiko, et al., "Design and Implementation of Dynamically Reconstructing System Software", *Software Engineering Conference,* Proceedings 1996 Asia–Pacific Seoul, South Korea Dec. 4–7, 1996, Los Alamitos, CA USA, IEEE Comput. Soc, US, ISBN 0–8186–7638–8,(1996).

Luke, Jahn et al., "Replacement Strategy for Aging Avionics Computers", *IEEE AES Systems Magazine,* XP002190614, (Mar. 1999).

Menezes, Oorschot, "Handbook of Applied Cryptography", *CRC Press LLC, USA XP002201307,* (1997),475.

Richt, Stefan, et al., "In–Circuit–Emulator Wird Echtzeittauglich", *Elektronic, Franzis Verlag GMBH, Munchen, DE,* vol. 40, No. 16, XP000259620, (100–103), Aug. 6, 1991.

Robin, John S., et al., "Analysis of the Pentium's Ability to Support a Secure Virtual Machine Monitor", *Proceedings of the 9th USENIX Security Symposium,* XP002247347, Denver, Colorado, (Aug. 14, 2000),1–17.

Saez, Sergio, et al., "A Hardware Scheduler for Complex Real–Time Systems", *Proceedings of the IEEE International Symposium on Industrial Electronics,* XP002190615, (Jul. 1999),43–48.

Sherwood, Timothy, et al., "Patchable Instruction ROM Architecture", *Department of Computer Science and Engineering, University of California, San Diego, La Jolla, CA,* (Nov. 2001).

\* cited by examiner

MANAGING A SECURE ENVIRONMENT USING A CHIPSET IN ISOLATED EXECUTION MODE

CROSS-REFERENCES TO RELATED APPLICATIONS

This is a continuation-in-part of U.S. patent application Ser. No. 09/540,613 filed Mar. 31, 2000.

BACKGROUND

1. Field of the Invention

This invention relates to microprocessors. In particular, the invention relates to processor security.

2. Description of Related art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modem microprocessor systems provide users convenient and efficient methods of doing business, communicating and transacting, they are also vulnerable to unscrupulous attacks. Examples of these attacks include theft of data, virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anti-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and executes the least trusted code. It is noted that the level of the ring hierarchy is independent to the level of the security protection of that ring.

Figure 1A:
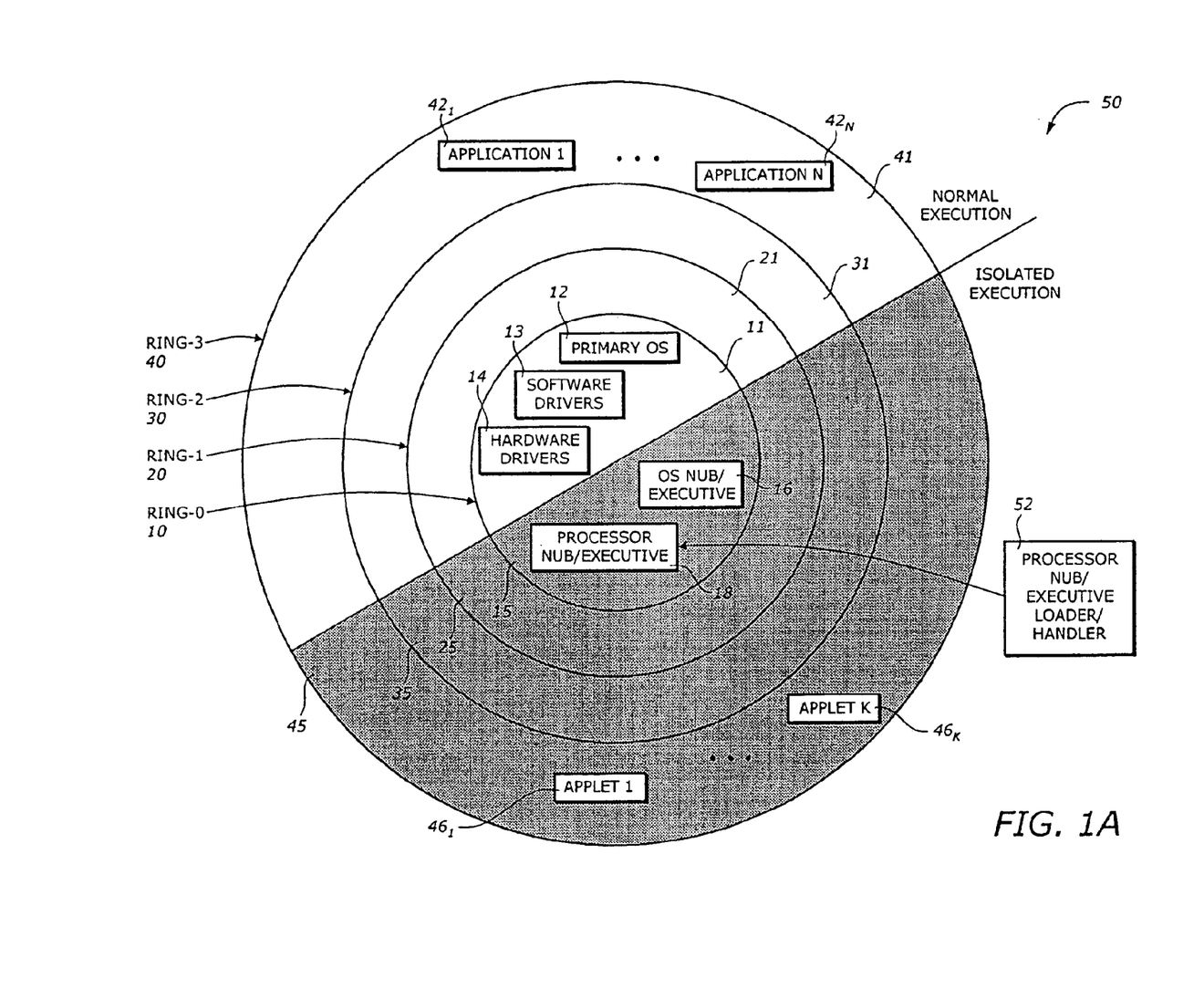
FIG. 1A is a diagram illustrating a logical operating architecture according to one embodiment of the invention.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of a processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. Portions of the isolated region may also be in cache memory. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode when accessing the isolated area. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub loader 52 and processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), drivers and even the primary operating system 12. The software that can interfere with or monitor the applet's execution is the processor nub loader 52, processor nub 18 or the operating system nub 16.

Figure 1B:
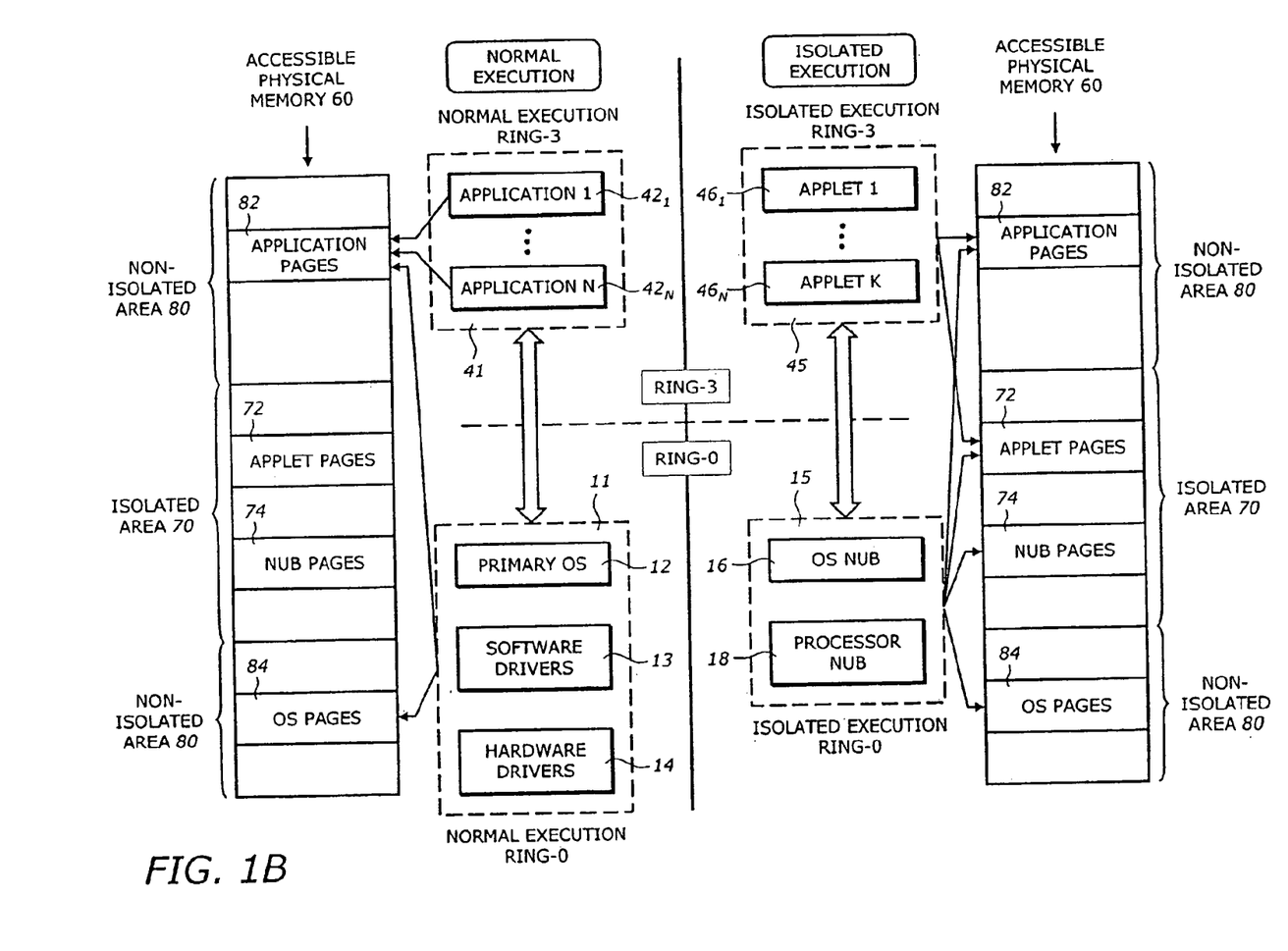
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a nonisolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Generally applications can only access to their own pages, however, the OS typically provides services for sharing memory in controlled methods. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only applet pages 72. The applets $46_1$ to $46_K$ reside in the isolated area 70. In general, applets can only access their own pages; however, the OS nub 16 can also provides services for the applet to share memory (e.g., share memory with other applets or with non-isolated area applications).

Figure 1C:
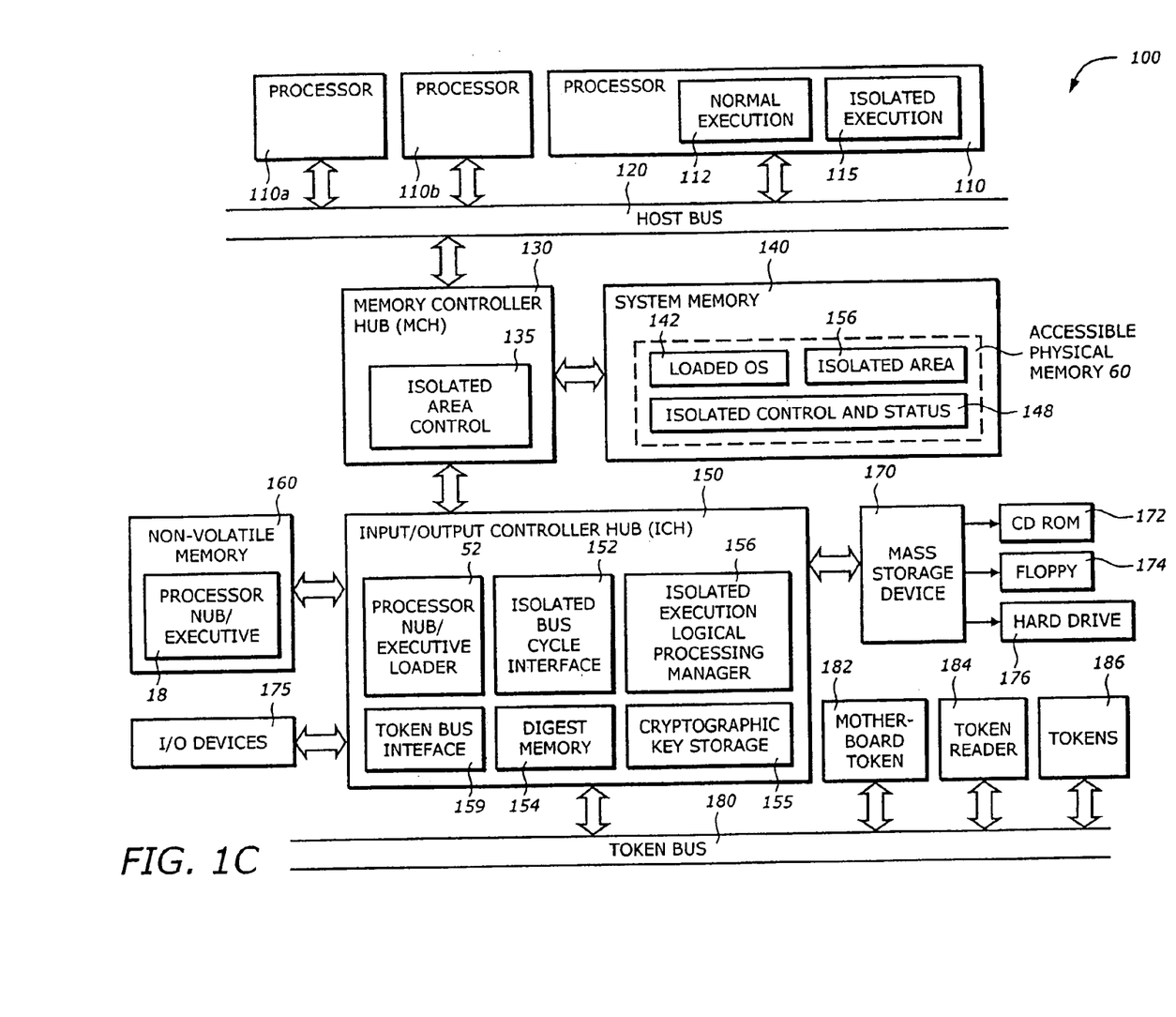
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc. The "token bus" may be part of the USB bus, e.g., it may be hosted on the USB bus.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a nonsecure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and access checking.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles. The isolated access bus mode is asserted on memory accesses initiated while the processor 110 is in the isolated execution mode and it is accessing memory within the isolated area. The isolated access bus mode is also asserted on instruction pre-fetch and cache write-back cycles if the address is within the isolated area address range. The isolated access bus mode is configured within the processor 110. The processor 110 responds to a snoop cycle to a cached address when the isolated access bus mode on the FSB matches the mode of the cached address.

The MCH 130 provides control and configuration of system memory 140. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110. The isolated control and status space 148 contains mainly the isolated execution control and status registers. The isolated control and status space 148 does not overlap any existing address space and is accessed using the isolated bus cycles. The system memory 140 may also include other programs or data that are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., cryptographic hash) value. The processor nub loader 52 is invoked by execution of an appropriate isolated instruction (e.g., Iso_Init) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., cryptographic hash) values of the loaded processor nub 18, the operating system nub 16, and any other supervisory modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created during manufacturing with a cryptographic random number generator. The isolated execution logical processor manager 156 manages the operation of logical processors configuring their isolated execution mode support. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the all supervisory code involved in controlling the isolated execution configuration and operation. The isolated digest is used to attest or prove the state of the current isolated execution environment.

The non-volatile memory 160 stores non-volatile information. Typically, the non-volatile memory 160 is implemented in flash memory. In one embodiment, the non-volatile memory 160 includes the processor nub 18. The processor nub 18 provides set-up and low-level management of the isolated area 70 (in the system memory 140), including verification, loading, and logging of the operating system nub 16, and the management of the symmetric key used to protect the operating system nub's secrets. The processor nub loader 52 performs some part of the setup and manages/updates the symmetric key before the processor nub 18 and the OS nub 16 are loaded. The processor nub 18 The processor nub 18 may also provide interface abstractions to low-level security services provided by other hardware. The processor nub 18 may also be distributed by the original equipment manufacturer (OEM) or operating system vendor (OSV).

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory via the token bus 180.

A Chipset Circuit to Manage a Secure Platform

The overall architecture discussed above provides a basic insight into a hierarchical executive architecture to manage a secure platform. The elements shown in FIG. 1A, 1B, and 1C are instances of an abstract model of this hierarchical executive architecture. The implementation of this hierarchical executive architecture is a combination of hardware and software. In what follows, the processor executive, the processor executive handler, and the operating system executive are abstract models of the processor nub 18, the processor nub loader 52, and the operating system nub 16 (FIG. 1A, 1B, and 1C), respectively.

Figure 2:
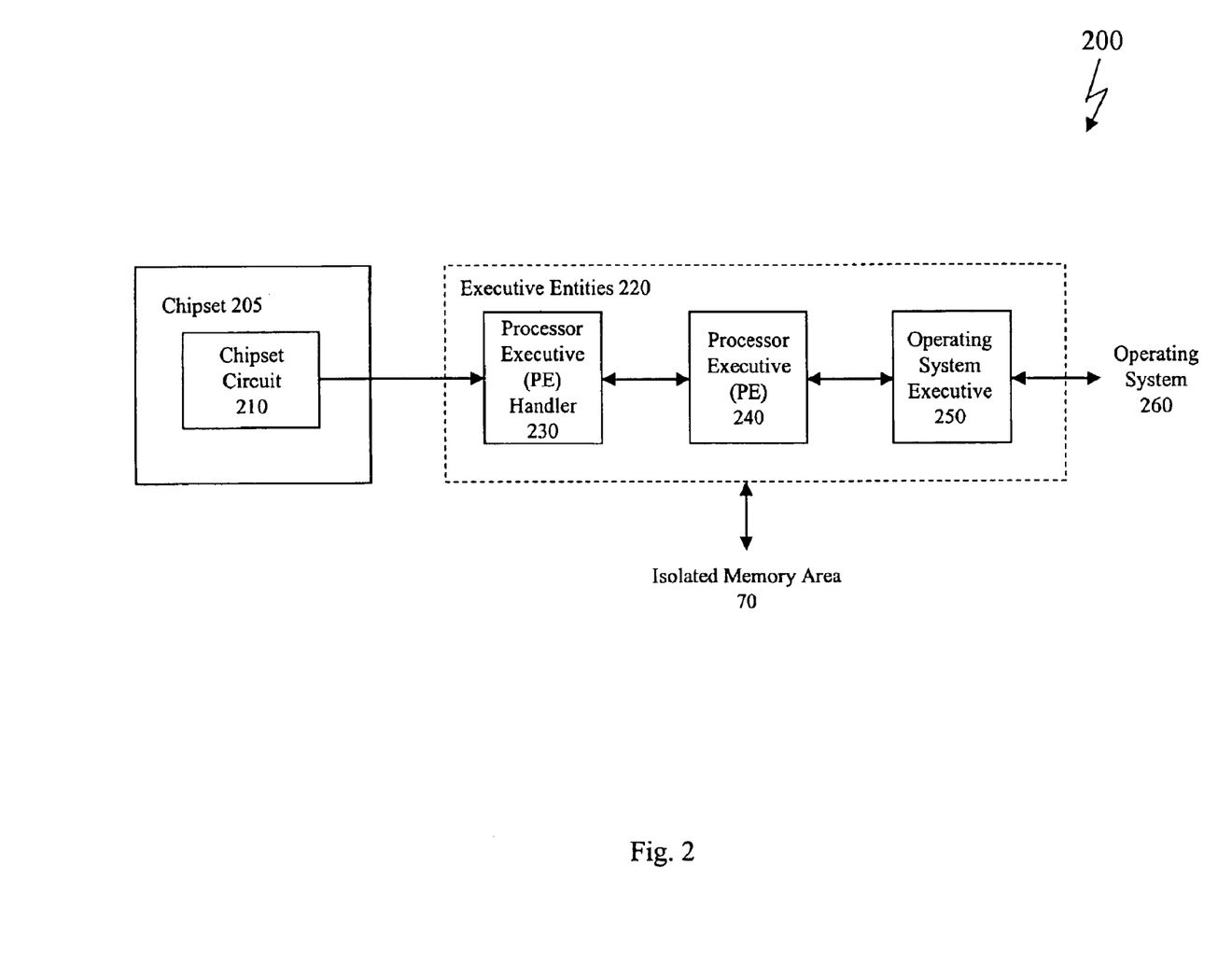
FIG. 2 is a diagram illustrating a chipset environment according to one embodiment of the invention.

FIG. 2 is a diagram illustrating a chipset environment 200 according to one embodiment of the invention. The chipset environment 200 includes a chipset 205 and executive entities 220.

The chipset 205 is an integrated device that provides the necessary infrastructure for the isolated execution mode in the platform. In one embodiment, the chipset 205 is the input/output controller hub (ICH) 150 shown in FIG. 1C. The chipset 205 includes a chipset circuit 210. The chipset circuit 210 includes the functionalities to allow a platform to operate in a secure environment. The secure environment is associated with the isolated memory area (e.g., the isolated memory area 70 shown in FIG. 1C) that is accessible to a processor in the platform. The platform may have one or multiple processors (e.g., the processor 110 in FIG. 1C). Each processor may operate in one of a normal execution mode and an isolated execution mode. Each processor may have one or multiple logical threads. The chipset 205 keeps tracks of the number of logical threads operating in the execution mode for the entire platform, whether the platform is a uni- or multi-processor system.

The executive entities 220 include a number of executives that are designed to operate in the secure environment. The executive entities 220 are associated with the isolated memory area 70 (FIG. 1C). The executive entities 220 include a processor executive (PE) handler 230, a PE 240, and an operating system executive (OSE) 250. The PE handler 230 handles the PE 240. The PE 240 handles the OSE 250. The OSE 250 interfaces to a subset of the operating system (OS) 260 running on the platform. As mentioned above, the PE handler 230, the PE 240, and the OSE 250 are abstract models of the processor nub loader 52, the processor nub 18, and the operating system nub 16, respectively, shown in FIGS. 1A–1C.

Figure 3:
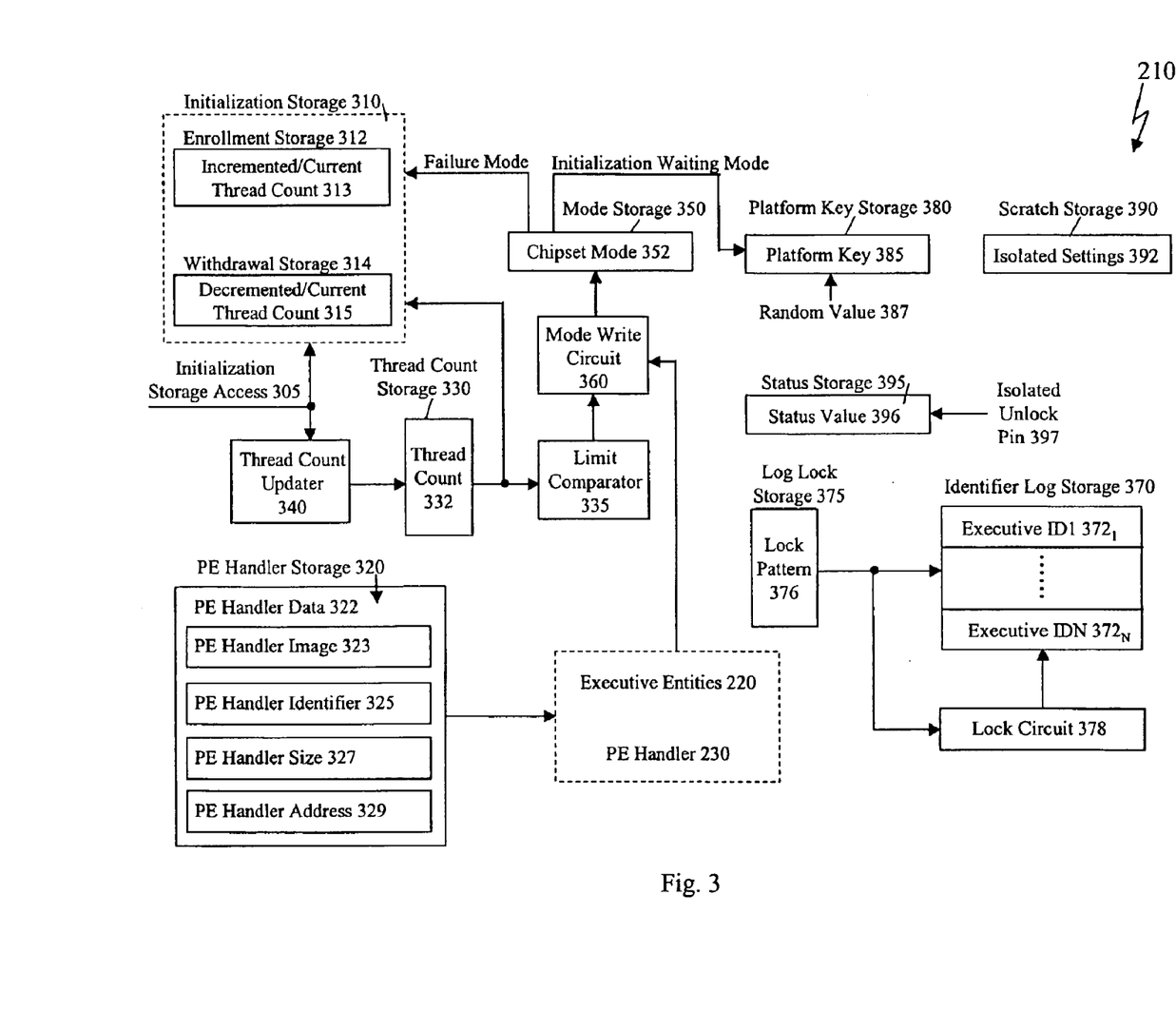
FIG. 3 is a diagram illustrating a chipset circuit shown in FIG. 2 according to one embodiment of the invention.

FIG. 3 is a diagram illustrating the chipset circuit 210 shown in FIG. 2 according to one embodiment of the invention. The chipset circuit 210 includes an initialization storage 310, a PE handler storage 320, a thread count storage 330, a thread count updater 340, a mode storage 350, a mode write circuit 360, an identifier log storage 370, a log lock storage 375, a lock circuit 378, a platform key storage 380, a scratch storage 390, and a status storage 395. The initialization storage 310, the PE handler storage 320, the thread count storage 330, the mode storage 350, the identifier log storage 370, the log lock storage 375, the platform key storage 380, the scratch storage 390, and the status storage 390 are all mapped into an input/output address space accessible to the processor 110 in isolated execution mode. The thread count updater 340, the mode write circuit 360, and the lock circuit 378 are invoked or triggered when the corresponding storage is accessed.

The initialization storage 310 is used to initialize the chipset 205 for isolated execution mode. The initialization storage is accessed by an initialization storage access signal 305. The initialization storage access signal 305 represents an input/output bus access cycle decoded to the initialization storage address as generated by one of the processors in the system (e.g., processor 110 in FIG. 1C).

The PE handler storage 320 stores PE handler data 322. The PE handler data 322 include a PE handler image 323, a PE handler cryptographic identifier 325, a PE handler size 327, and a PE handler address 329. The PE handler image 323 is to be loaded into the isolated memory area 70 after the chipset 205 is initialized. The loaded PE handler image 323 corresponds to the PE handler 230 in the executive entities 220 (FIG. 2).

The thread count storage 330 stores a thread count 332 to indicate the number of threads currently initialized for operating in the isolated execution mode. The thread count 332 is useful for a thread to know if it is the first thread to initialize the platform in the isolated execution mode and whether it is the last thread to close the isolated area. The limit comparator 335 compares the thread count 332 with high and low limits to determine if the thread count has exceeded the maximum threads. When a maximum limit is exceeded, a failure or fault condition is generated. When the thread count reaches a minimum limit (e.g., zero), the log lock storage 375 is initialized to its initial conditions. The updated thread count is one of an incremented thread count and a decremented thread count. The incremented thread count is returned when one of the threads enrolls in the isolated execution mode. The decremented thread count is returned when one of the enrolled threads withdraws from the isolated execution mode.

The mode storage 350 stores a chipset mode 352. The mode circuit 360 writes the chipset mode 352 into the mode storage 350. The chipset mode 352 indicates a mode of operation of the chipset 205. This mode of operation includes an initialization waiting mode, a PE initialization in-progress mode, a PE initialization completion mode, an OSE loaded mode, a closing mode, and a failure mode. The initialization waiting mode indicates that the chipset is waiting for initialization. The PE initialization in-progress mode indicates that the PE is being executed. The PE initialization completion mode indicates that the PE is completed. The OSE loaded mode indicates the OSE has been loaded. The closing mode indicates that the isolated execution mode is closed. The failure mode indicates that there is a failure.

The identifier log storage 370 stores cryptographic identifiers 372$_1$ to 372$_N$ of the executive entities loaded in the isolated execution mode even if they are later loaded. The cryptographic identifiers 372$_1$ to 372$_N$ are read-only when in lock. The log lock storage 375 stores a lock pattern 376 to indicate which of the cryptographic identifiers 372$_1$ to 372$_N$ is in lock. To be "in lock" means that the corresponding identifier cannot be modified or written. The lock pattern 376 is initialized when the thread count reaches the minimum limit. The cryptographic identifiers 372$_1$ to 372$_N$ are locked based on the lock pattern 376.

The platform key storage 380 stores a platform key 385. The platform key 385 is used in handling the executive entities 220. The platform key 385 is returned when the platform key storage 380 is read in an initialization waiting mode as set by the mode storage 350 which will be described later. The platform key 385 is programmed at manufacturing time to a random value 387.

The scratch storage 390 stores isolated settings 392 used to configure the isolated execution mode. The isolated settings 392 include an isolated base value, an isolated length value, and a processor executive entry address. The isolated base and length values define the isolated memory area 70, and are essentially the same as the isolated base and length values as stored in the processor 110 and other chipsets (e.g., the MCH 130 in FIG. 1C).

The status storage 395 stores a status value 396 of an isolated unlock pin 397.

Figure 4:
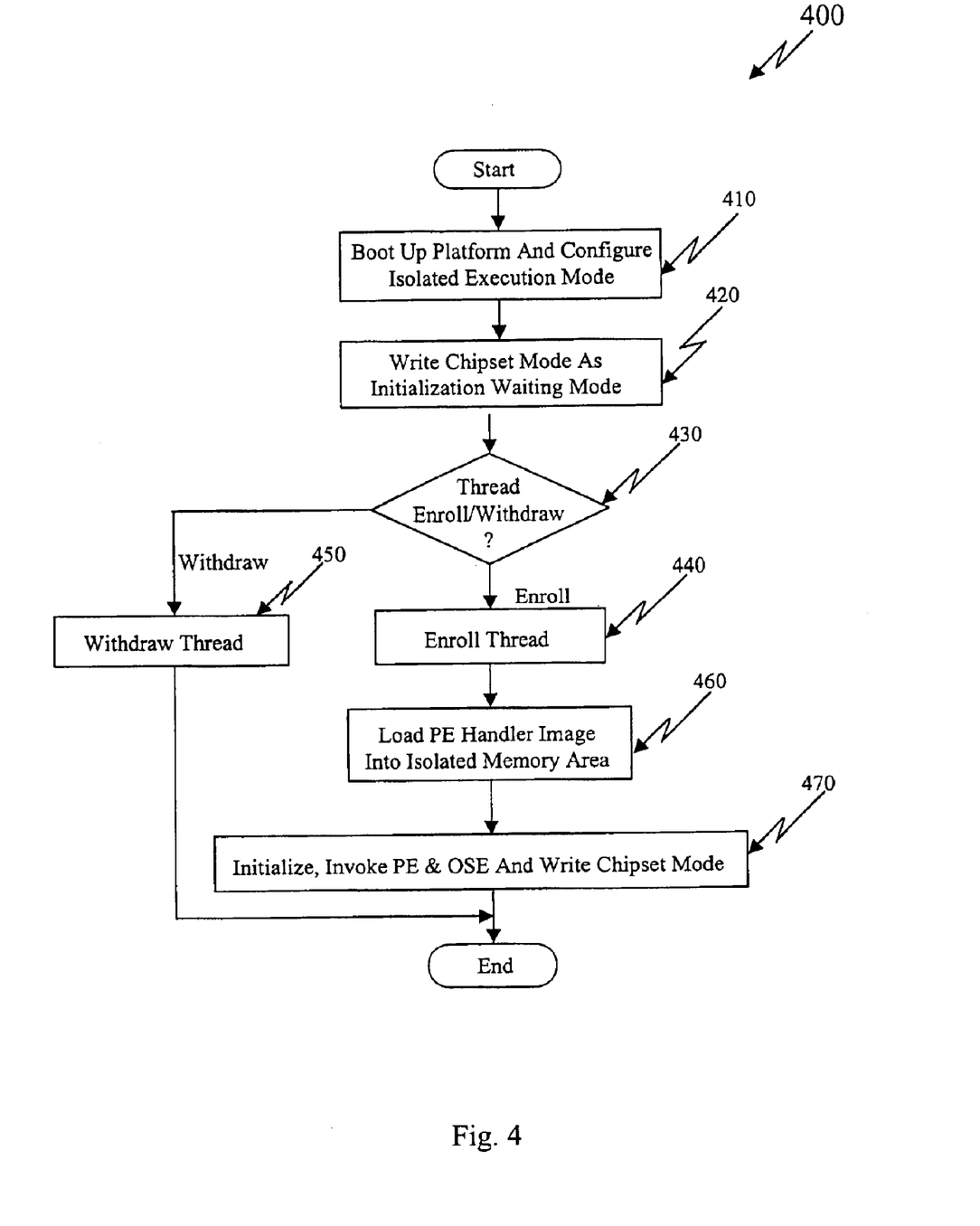
FIG. 4 is a flowchart illustrating a process to manage a chipset according to one embodiment of the invention.

FIG. 4 is a flowchart illustrating a process 400 to manage a chipset according to one embodiment of the invention.

Upon START, the process 400 boots up the platform and configures the platform in the isolated execution mode (Block 410). Then, the process 400 writes the chipset mode as the initialization waiting mode (Block 420). Then, the process 400 determines if the thread operation is a thread enrollment or a thread withdrawal (Block 430). If it is a thread enrollment, the process 400 enrolls the thread (Block 440). If it is a thread withdrawal, the process 400 withdraws the thread (Block 450) and is then terminated.

After the process 400 enrolls the thread, the process 400 loads the PE handler image into the isolated memory area (Block 460). The loaded PE handler image becomes the PE handler. Next, the process 400 initializes, invokes PE and OSE and write chipset mode (Block 470). Then, the process 400 is terminated.

Figure 5:
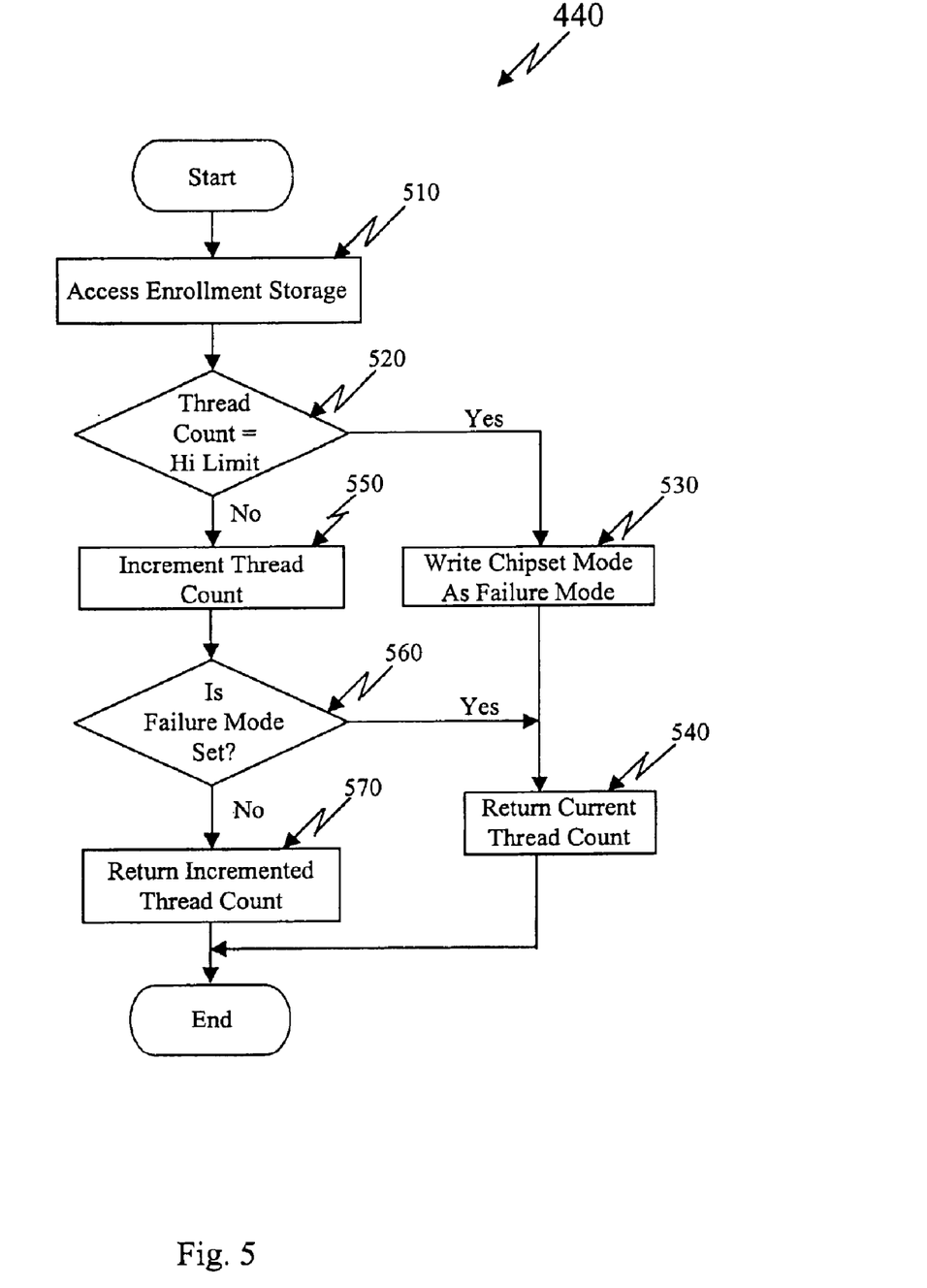
FIG. 5 is a flowchart illustrating a process to enroll a thread according to one embodiment of the invention.

FIG. 5 is a flowchart illustrating the process 440 to enroll a thread shown in FIG. 4 according to one embodiment of the invention.

Upon START, the process 440 accesses the enrollment storage (Block 510). The process 440 determines if the thread count has reached the high limit or if the error mode is set (Block 520). If yes, the process 440 writes the chipset mode as a failure mode (Block 530), returns the current thread count (Block 540) and is terminated. Otherwise, the process 440 increments the thread count (Block 550). The process 440 then determines if failure mode is set (Block 560). If yes, the process 440 returns the current thread count (Block 540). Otherwise, the process 440 returns incremented thread count (Block 570). The process 440 is terminated.

Figure 6:
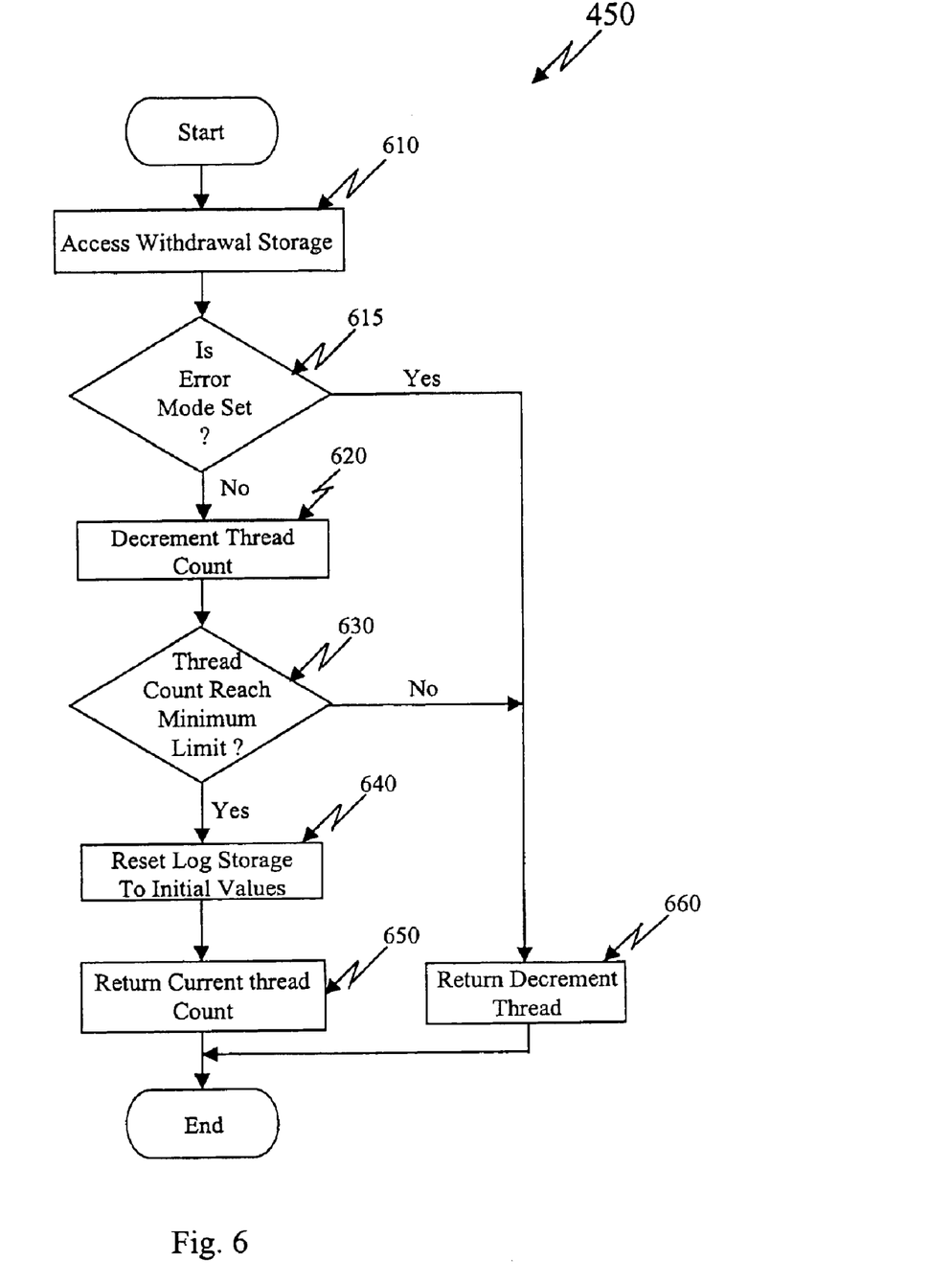
FIG. 6 is a flowchart illustrating a process to withdraw a thread according to one embodiment of the invention.

FIG. 6 is a flowchart illustrating the process 450 to withdraw a thread shown in FIG. 4 according to one embodiment of the invention.

Upon START, the process 450 accesses the withdrawal storage (Block 610). The process 450 checks to see if the error/failure mode is set (Block 615). If yes, the process 450 returns the decrement thread count current (Block 660). The process 450 is terminated. Otherwise, the process 450 decrements the thread count (Block 620). Then, the process 450 determines if the thread count has reached a minimum limit (Block 630). If no, the process 450 returns the decremented thread count (Block 660)

What is claimed is:

1. An apparatus comprising:
    a PE handler storage to store a PE handler image to be loaded into an isolated memory area within a memory of a processing system after at least a portion of a chipset circuit of the processing system is initialized, the PE handler image to be executed by a processor of the processing system, the processor capable of operating in a normal execution mode and in an isolated execution mode; and
    an initialization storage to configure the processing system in the isolated execution mode, the processor capable of accessing the isolated memory area when operating in the isolated execution mode.

2. The apparatus of claim 1, further comprising:
    a thread count storage to store a thread count indicating a number of threads currently initialized for operation in the isolated execution mode.

3. The apparatus of claim 1, further comprising:
    an identifier log storage to store a cryptographic identifier of an executive entity loaded into the isolated execution mode.

4. The apparatus of claim 3, wherein the executive entity comprises at least one entity selected from the group consisting of a PE, a PE handler, and an operating system executive (OSE).

5. The apparatus of claim 1, further comprising:
a platform key storage to store a platform key used in handling an executive entity loaded into the isolated execution mode; and
a scratch storage to store isolated settings used to configure the isolated execution mode.

6. The apparatus of claim 5 wherein the isolated settings comprise one or more values selected from the group consisting of an isolated base value for the isolated memory area, an isolated length value for the isolated memory area, and a processor executive entry address.

7. The apparatus of claim 1, further comprising:
a chipset circuit that provides the PE handler storage and the initialization storage, the chipset circuit capable of supporting at least one chipset mode selected from the around consisting of:
an initialization waiting mode to indicate the chipset circuit is waiting for initialization;
a PE initialization in-progress mode to indicate the PE is being executed;
a PE initialization completion mode to indicate the PE is completed;
an OSE loaded mode to indicate the OSE has been loaded; and
a closing mode to indicate the isolated execution mode is closed.

8. The apparatus of claim 1, wherein the initialization storage:
returns an incremented thread count when a thread enrolls in the isolated execution mode and
returns a decremented thread count when an enrolled thread withdraws from the isolated execution mode.

9. The apparatus of claim 1, further comprising a mode write circuit to write a failure mode into the chipset circuit when a thread limit is reached.

10. The apparatus of claim 1, the PE handler storage further to store at least one item selected from the group consisting of a cryptographic PE handler identifier, a PE handler size, and a PE handler address.

11. The apparatus of claim 1, wherein the PE handler storage comprises a read-only memory.

12. The apparatus of claim 1, further comprising a platform key storage to return a platform key when the chipset circuit is read in an initialization waiting mode.

13. The apparatus of claim 12 wherein the platform key is programmed to a random value.

14. The apparatus of claim 1, further comprising:
a status storage to store a status value of an isolated unlock pin used in setting platform settings.

15. A method comprising:
storing a processor executive (PE) handler image in a PE handler storage of a chipset circuit, the chipset circuit in communication with a processor that supports a normal execution mode and an isolated execution mode, and in communication with a memory to include an isolated memory area accessible to the processor in the isolated execution mode; and
after at least a portion of the chipset circuit is initialized, loading the PE handler image into the isolated memory area.

16. The method of claim 15, further comprising:
storing a thread count in a thread count storage indicating number of threads currently initialized for operation in the isolated execution mode.

17. The method of claim 15, further comprising:
storing cryptographic identifiers of executive entities loaded into the isolated execution mode.

18. The method of claim 17, wherein the executive entities comprise at least one entity selected from the group consisting of a PE, a PE handler, and an operating system executive (OSE).

19. The method of claim 15, further comprising:
obtaining a platform key used in handling the executive entities from a platform key storage; and
obtaining isolated settings used to configure the isolated execution mode from the chipset circuit.

20. The method of claim 19 wherein the operation of obtaining isolated settings comprises obtaining at least one value selected from the group consisting of an isolated base value for the isolated memory area, an isolated length value for the isolated memory area, and a processor executive entry address.

21. The method of the claim 15, further comprising operating in a series of chipset modes comprising:
an initialization waiting mode to indicate the chipset circuit is waiting for initialization;
a PE initialization in-progress mode to indicate the PE is being executed;
a PE initialization completion mode to indicate the PE is completed;
an OSE loaded mode to indicate the OSE has been loaded; and
a closing mode to indicate the isolated execution mode is closed.

22. The method of claim 15, further comprising initializing at least a portion of the chipset circuit.

23. The method of claim 15, further comprising:
returning an incremented thread count when a thread enrolls in the isolated execution mode; and
returning a decremented thread count when an enrolled thread withdraws from the isolated execution mode.

24. The method of claim 15, further comprising writing a chipset mode corresponding to a failure mode when the a thread count reaches a thread limit.

25. The method of claim 15, wherein the PE handler storage comprises read-only memory.

26. The method of claim 15, further comprising obtaining a platform key from a platform key storage when the chipset circuit is in an initialization waiting mode.

27. The method of claim 15, further comprising:
storing a status value of an isolated unlock pin used to unlock platform settings.

28. A system comprising:
a processor capable of selectively operating in a normal execution mode and, alternatively, in an isolated execution mode;
a memory to include an isolated memory area accessible to the processor in the isolated execution mode;
a chipset circuit in communication with the processor and the memory; and
a PE handler storage in the chipset circuit, the PE handler storage to store a PE handler image to be loaded into the isolated memory area after at least a portion of the chipset circuit is initialized.

29. The system of claim 28 wherein the chipset circuit further comprises:
a thread count storage to store a thread count indicating a number of threads currently associated with the isolated execution mode.

30. The system of claim 28 wherein the chipset circuit further comprises:
an identifier log storage to store cryptographic identifiers of executive entities associated with the isolated execution mode.

31. The system of claim 30 wherein the executive entities comprise:
a processor executive (PE);
a PE handler; and
an operating system executive (OSE).

32. The system of claim 28 wherein the chipset circuit further comprises:
a platform key storage to store a platform key used in handling executive entities; and
a scratch storage to store isolated settings used to configure the isolated execution mode.

33. The system of claim 32 wherein the platform key is returned when the platform key storage is read with the chipset circuit in an initialization waiting mode.

34. The system of claim 32 wherein the platform key comprises a random value.

35. The system of claim 32 wherein the isolated settings comprise one or more values selected from the group consisting of an isolated base value for the isolated memory area, an isolated length value for the isolated memory area, and a processor executive entry address.

36. The system of claim 28 wherein the chipset circuit further comprises a mode storage to store a chipset mode indicating a mode of operation of the chipset circuit, the chipset mode comprising one or more modes selected from the group consisting of:
an initialization waiting mode to indicate the chipset circuit is waiting for initialization;
a PE initialization in-progress mode to indicate the PE is being executed;
a PE initialization completion mode to indicate the PE is completed;
an OSE loaded mode to indicate the OSE has been loaded; and
a closing mode to indicate the isolated execution mode is closed.

37. The system of claim 36 wherein the chipset circuit further comprises a mode write circuit to write a failure mode into the mode storage when a thread limit is reached.

38. The system of claim 28 wherein the chipset circuit further comprises an initialization storage
to return an incremented thread count when a thread enrolls in the isolated execution mode, and
to return a decremented thread count when an enrolled thread withdraws from the isolated execution mode.

39. The system of claim 28, the PE handler storage further to store at least one item selected from the group consisting of a PE handler cryptographic identifier, a PE handler size, and a PE handler address.

40. The system of claim 28 wherein the PE handler storage comprises a non-volatile memory.

41. The system of claim 28 wherein the chipset circuit further comprises:
a status storage to store a status value of an isolated unlock pin used to unlock platform settings.

42. An apparatus comprising:
a machine accessible medium; and
instructions encoded in the machine accessible medium, wherein the instructions, when executed by a processing system with a processor and a chipset circuit that supports a normal execution mode and an isolated execution mode, cause the processing system to perform operations comprising:
obtaining a processor executive (PE) handler image from a PE handler storage in the chipset circuit; and
after at least a portion of the chipset circuit is initialized, loading the PE handler image into an isolated memory area within a memory of the processing system, the isolated memory area accessible to the processor in the isolated execution mode.

43. The apparatus of claim 42, wherein the machine accessible medium further comprises:
instructions to store a thread count indicating number of threads currently initialized for operation in the isolated execution mode.

44. The apparatus of claim 42, wherein the machine accessible medium further comprises:
instructions to store cryptographic identifiers of executive entities loaded into the isolated execution mode.

45. The apparatus of claim 42, wherein the machine accessible medium further comprises:
instructions to store a platform key used in handling executive entities.

46. The apparatus of claim 42, wherein the machine accessible medium further comprises:
instructions to configure the isolated execution mode, based at least in part on isolated settings associated with the processing system.

47. The apparatus of claim 46, wherein the isolated settings include at least one value selected from the group consisting of an isolated base value for the isolated memory area, an isolated length value for the isolated memory area, and a processor executive entry address.

48. The apparatus of claim 42, wherein the instructions implement executive entities comprising at least one entity selected from the group consisting of:
a PE;
a PE handler; and
an operating system executive (OSE).

49. The apparatus of claim 42, wherein the machine accessible medium further comprises:
instructions to initialize at least a portion of the chipset circuit.

50. The apparatus of claim 42, wherein the machine accessible medium further comprises:
instructions to increment a thread count when a thread enrolls in the isolated execution mode; and
instructions to decrement a thread count when an enrolled thread withdraws from the isolated execution mode.

51. The apparatus of claim 42, wherein the instructions obtain the PE handler image from a read-only memory.

52. The apparatus of claim 42, wherein the instructions obtain a platform key from a platform key storage when the chipset circuit is in an initialization waiting mode.

53. The apparatus of claim 42, wherein the machine accessible medium further comprises instructions to store a status value of an isolated unlock pin used to unlock platform settings.

* * * * *

UNITED STATES PATENT AND TRADEMARK OFFICE
CERTIFICATE OF CORRECTION

PATENT NO. : 7,085,935 B1  Page 1 of 1
APPLICATION NO. : 09/668408
DATED : August 1, 2006
INVENTOR(S) : Ellison et al.

It is certified that error appears in the above-identified patent and that said Letters Patent is hereby corrected as shown below:

In column 1, at line 22, delete "modem" and insert --modern--.

In column 8, at line 37, delete "handier" and insert --handler--.

In column 8, at line 52, delete "handier" and insert --handler--.

In column 10, at line 48, delete "PE" and insert --processor executive (PE)--.

In column 12, at line 64, delete "PE" and insert --processor executive (PE)--.

Signed and Sealed this

Twenty-ninth Day of April, 2008

JON W. DUDAS
*Director of the United States Patent and Trademark Office*